(12) United States Patent
Rapp

(10) Patent No.: US 6,402,035 B1
(45) Date of Patent: Jun. 11, 2002

(54) CARD READER

(75) Inventor: Hans-Jochen Rapp, Rottweil (DE)

(73) Assignee: ddm hopt + schuler GmbH & Co. KG (DE)

( * ) Notice: Subject to any disclaimer, the term of this patent is extended or adjusted under 35 U.S.C. 154(b) by 0 days.

(21) Appl. No.: 09/509,573

(22) PCT Filed: Jan. 10, 1998

(86) PCT No.: PCT/DE98/02920

§ 371 (c)(1),
(2), (4) Date: Mar. 28, 2000

(87) PCT Pub. No.: WO99/18535

PCT Pub. Date: Apr. 15, 1999

(30) Foreign Application Priority Data

Oct. 4, 1997 (DE) .......................................... 197 43 936

(51) Int. Cl.$^7$ ............................................... G06K 13/00
(52) U.S. Cl. ........................ 235/475; 235/483; 235/486
(58) Field of Search ................. 235/475, 483, 235/485, 486, 482, 479, 484

(56) References Cited

U.S. PATENT DOCUMENTS

| 4,873,425 A | 10/1989 | Langlais et al. ............. 235/441 |
| 5,508,501 A | 4/1996 | Fujimoto et al. ........... 235/441 |
| 6,070,802 A | * 6/2000 | Yi |

FOREIGN PATENT DOCUMENTS

| DE | 297 17 712 | 1/1998 |
| JP | 09-035020 | * 2/1997 |

* cited by examiner

*Primary Examiner*—Michael G. Lee
*Assistant Examiner*—Diane I. Lee
(74) *Attorney, Agent, or Firm*—Walter A. Hackler

(57) ABSTRACT

In order to assure a reliable insertion into the data exchange position even of cards with strongly bent downwards surface in longitudinal direction for a card reader (1), into which a data storage card (2) can be inserted for information exchange, with a card guide (4,5) which guides the card (2) approximately horizontally into its data-exchange position, which card guide is interrupted downwards in a section in the direction of insertion (3), the length (L) of said interrupted section is less than the normal card length, and with a drop opening (8) for cards (2') of shorter length than normal cards (2) provided beneath the interrupted section (7), where when in the data exchange position, the front end (2a) of the card rests against a support (11) in the card reader (1), a stopping segment (15) extends, counter to the direction of insertion (3), from the support (11) to beneath the interrupted section (7) of the card guide. The stopping segment can be produced either as a one-piece injection moulded part together with the card reader housing, or it can be a separate piece.

12 Claims, 2 Drawing Sheets

CARD READER

FIELD OF THE INVENTION

The invention relates to a card reader, into which a data-storage card can be inserted for information exchange, with a card guide guiding the card approximately horizontally into its data exchange position. This card guide is interrupted downwards in a section in the direction of insertion. The length of the section is shorter than the normal card length. Beneath the interrupted section a drop opening is provided for cards with a shorter length than normal cards. In the data exchange position the front end of the card rests against a support of the card reader.

BACKGROUND OF THE INVENTION

Card readers of this kind are already known.

The length of cards, which carry an integrated circuit (chip cards) or a magnetic strip (strip cards), is standardised, and hence the card readers are designed for this "normal" card length only. In order to avoid a shorter card getting stuck in the card reader and hence blocking the insertion of another card or interfering with the data exchange of another card, the card guide of the known card readers is interrupted, such that a card which is too short falls through a drop opening in the bottom of the card reader downwards out of the card reader. A card of normal length runs in direction of insertion onto a bar-shaped support after the interrupted guide or after the drop opening, which support is formed by the free end of a projecting part protruding from the back side of the card reader housing counter the direction of insertion. This support guides the front end of the card into the data exchange position and at the same time forms a thrust bearing if in the data exchange position a read unit is lowered onto the upper side of the card.

Although the free end of the projecting part is formed with a stopping slope leading the inserted card into the data exchange position, there is danger even with cards of normal length, of not running onto the support, if their surface—for example due to wrong storage—is strongly bent downwards in longitudinal direction, but of being inserted beneath the support in a free space of the card reader, such that they "disappear" in the card reader, non-retrievable by the user.

It is therefore the object of the present invention to improve a card reader of the aforementioned type such that even with cards having a surface strongly bent downwards in longitudinal direction a reliable insertion up to the data exchange position can be assured.

SUMMARY OF THE INVENTION

This object is solved according to the invention in that a stopping segment extends from the support counter the direction of insertion to beneath the interrupted section of the card guide.

When inserting a card being strongly bent downwards, its front end runs in direction of insertion onto the stopping segment and is guided further and upwards onto the support by the stopping segment. The further the stopping segment extends into the region of the interrupted section or the drop opening, the more strongly the front end of the card can be bent downwards. However, the stopping segment may only extend thus far into the region of the interrupted section or drop opening, that dropping downwards out of the drop opening of a card which is too short is not impeded.

In particularly preferred embodiments of the invention, the stopping surface of the stopping segment is inclined downwards counter the direction of insertion. This has the essential advantage, that a card which is too short drops out of the card reader by tipping downwards.

Preferably, the support is formed by the free end of a projecting part extending from the back side of the card reader counter the direction of insertion.

A particularly small overall height of the card reader can be obtained in spite of the stopping segment, if the stopping segment is connected at one end with the support disposed approximately in the centre and at the other end with a side wall of the card reader.

A stopping segment can be provided on both sides of the support for improving the guiding of a strongly bent card.

The stopping segment can either be produced together with the housing of the card reader as a one-piece injection moulded part or can be a separate part. The latter makes possible a particularly cheap retrofitting of common card readers with stopping segments.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

DESCRIPTION OF A PREFERRED EMBODIMENT

Figure 1:
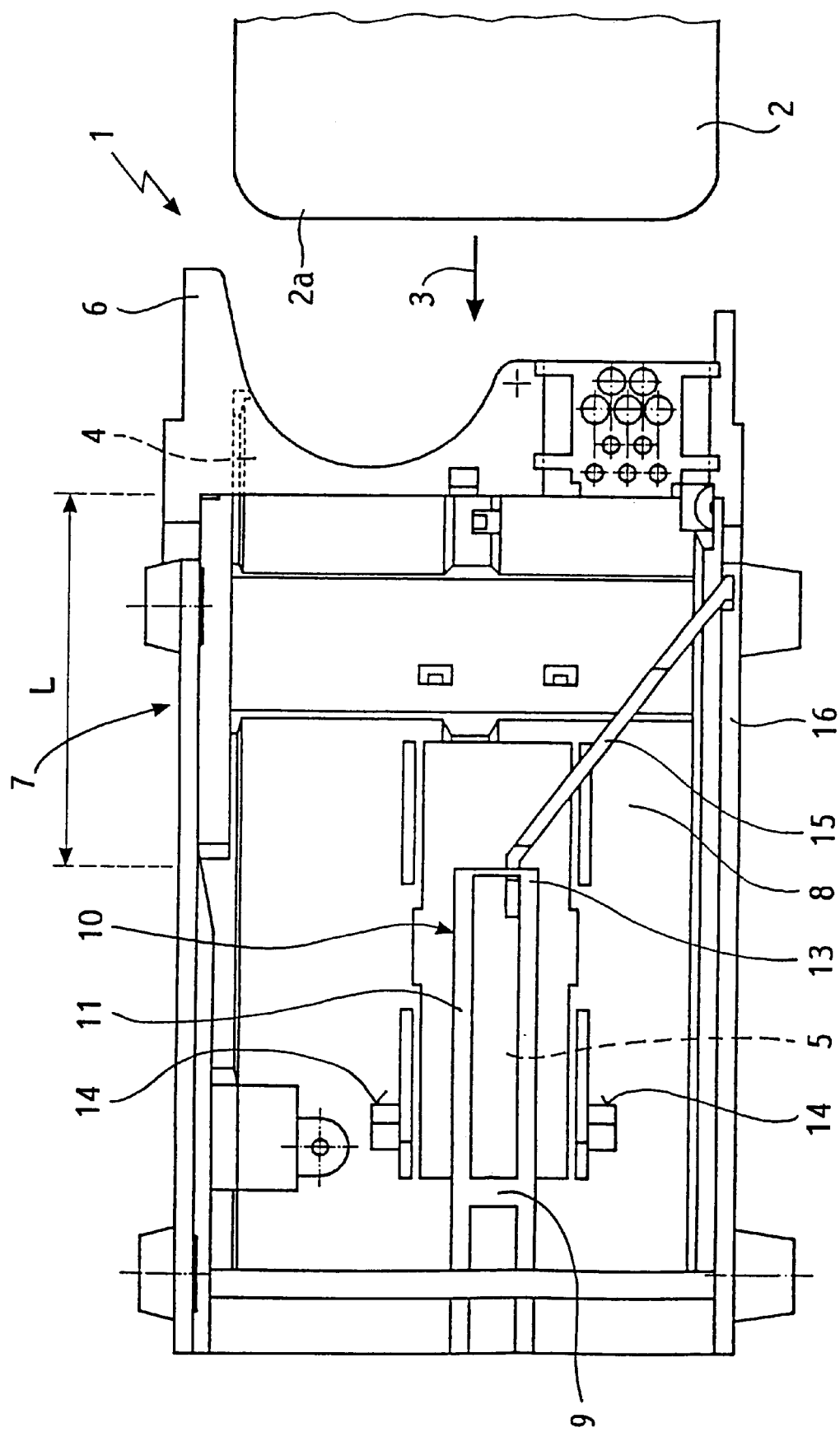
FIG. 1 shows a view from below of an example of an embodiment of a card reader according to the invention.

In FIG. 1 a card reader is denoted with 1, into which a card 2 can be inserted horizontally in direction of insertion 3 for the data exchange with for example a read unit (not shown). Seen in direction of insertion 3, a back and front card guide 4,5 are provided in the card reader 1. The back card guide 4 is formed by a slot-shaped opening in a mouth piece 6 of the card reader 1. Between those two card guides 4,5 the card is not guided on a length L, i.e. the card guide is interrupted in the section 7. A drop opening 8 is provided beneath the interrupted section 7. As described in more detail below, cards 2' with a shorter length than normal cards 2 can drop downwards out of the card reader through the drop opening 8.

A support 11 designed as projecting part 10 extends from the back side (back wall) 9 of the card reader 1 counter the direction of insertion beneath the horizontal card path plane. The front card end 2a not guided in the interrupted section 7 runs onto the free end 13 of the support 11, the free end thereof is provided with a stopping slope 12. The data exchange position is reached and the read unit is lowered or can be lowered onto the upper side of the card 2 if the front card end 2a hits two stoppers 14 in the card reader 1.

Figure 2:
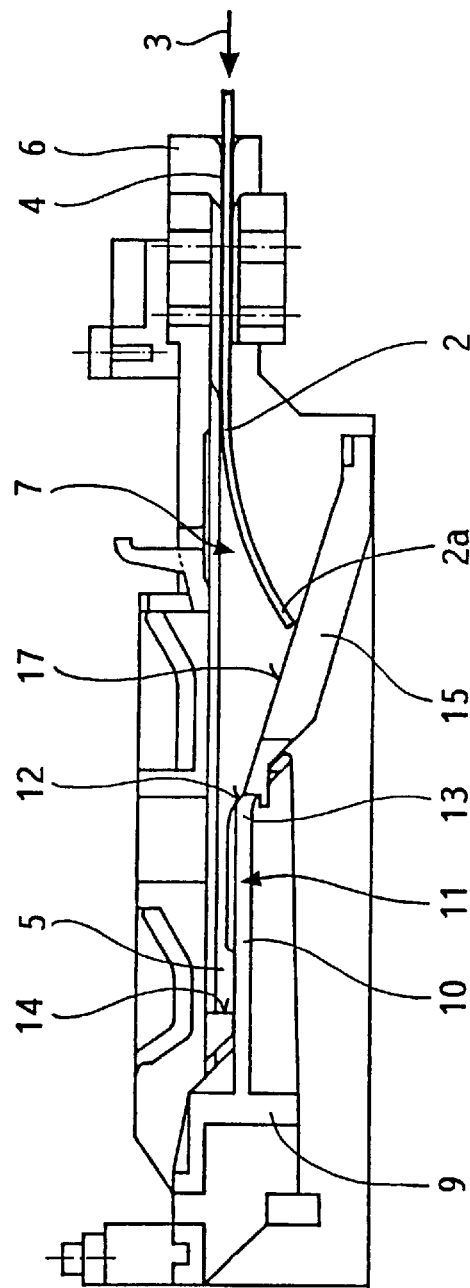
FIG. 2 shows a view of a longitudinal section of the card reader shown in FIG. 1, into which a card with bent surface is inserted.

A bow-shaped stopping segment 15 is connected with a free end 13 of the projecting part 10, which stopping segment 15 extends counter the direction of insertion 3 and laterally transversally to the direction of insertion 3 and is connected with a side wall 16 of the card reader 1 at the other end. This stopping segment 15 extends to beneath the interrupted section 7 of the card guide, where its upper stopping surface 17 (FIG. 2) is inclined downwards counter the direction of insertion.

During insertion of a card 2 strongly bent downwards (FIG. 2a), the front card end 2a thereof in direction of insertion 3 runs already onto the stopping surface 17 of the stopping segment 15 in the interrupted section 7 of the card guide and is guided upwards during further insertion up to the level of the projecting part 10, then it is guided further thereon up to the data exchange position. This bent card 2 would end up below the projecting part 10 without the stopping segment 15 and would "disappear" there, i.e. the card reader 1 would "swallow" such a card 2.

Figure 3:
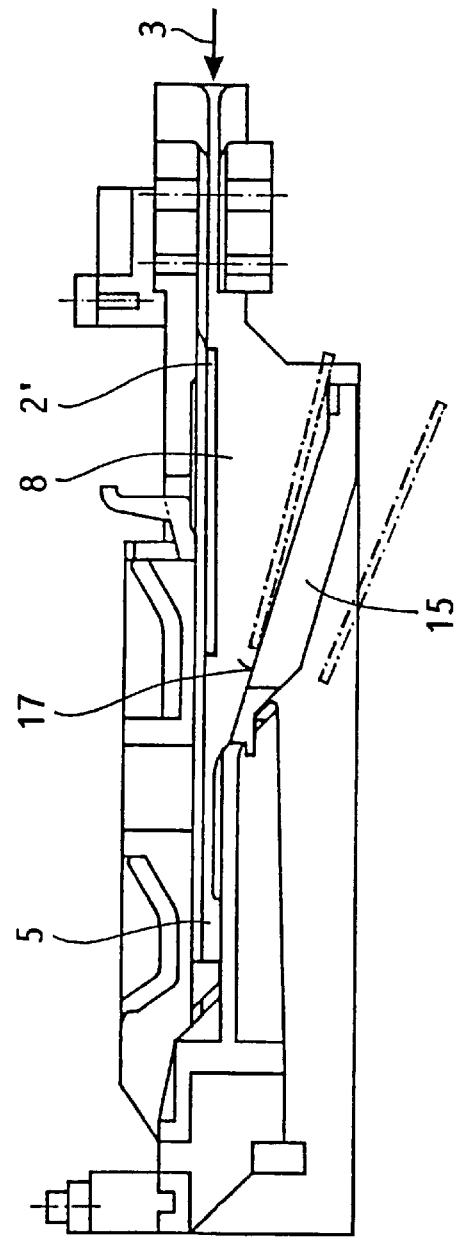
FIG. 3 shows the card reader of FIG. 2, into which a card which is too short is inserted.

In contrast, if a card 2' which is too short, with a length shorter than the length L of the interrupted section 7 is inserted into the card reader 1 (FIG. 3), it falls out of the horizontal card path plane downwards through the drop opening 8 onto the inclined stopping surface 17, such that it tips downwards on said stopping surface 17 counter the direction of insertion 3 and drops out of the card reader 1, as indicated with dot-dashed lines in FIG. 3.

In the shown example of an embodiment the stopping segment 15 is a separate bow, which can be detachably or nondetachably attached to the projecting part 10 and the side wall 16, for example it is suspended.

What is claimed is:

1. Card reader (1) into which a data-storage card (2) is insertable for information exchange, the card reader comprising: a card guide (4,5) guiding the card (2) approximately horizontally in to a data exchange position, which card guide (4,5) is interrupted in a section in direction of insertion, a length (L) of said section is shorter than normal card length;

and which card guide comprises a support (11) at end of the card guide, behind the interrupted section in direction of insertion;

with a drop opening (8) provided beneath the interrupted section (7) for cards (2') with a shorter length than normal cards (2);

and with a bow-shaped stopping segment (15) which extends from the support (11) counter a direction of insertion (3) to beneath the interrupted section (7) of the card guide (4,5), a stopping surface (17) thereof extends in the direction of insertion (3) inclined upwards to the support (11) and guides a front card end (2a) hanging downwards onto the support (11) into the data exchange position, the stopping segment (15) extends from the support (11) in the center of the card guide transversally towards a side wall.

2. Card reader according to claim 1, characterized in that the support (11) is formed by free end (13) of a projecting part (10) extending from the back side (9) of the card reader (1) counter the direction of insertion (3).

3. Card reader according to claim 1, characterized in that the stopping segment (15) is connected at one end with the support (11), which is disposed approximately in the center, and at an other end with a side wall (16) of the card reader (1).

4. Card reader according to claim 1 characterized in that the stopping segment (15) is produceable as a one-piece injection molded part together with a housing of the card reader (1).

5. Card reader according to claim 1, characterized in that the stopping segment (15) is a separate piece.

6. Card reader according to claim 1, characterized in that the support (11) is formed by free end (13) of a projecting part (10) extending from the back side (9) of the card reader (1) counter the direction of insertion (3), the stopping segment (15) is connected at one end with the support (11), which is disposed approximately in the center, and at the other end with a side wall (16) of the card reader (1), the stopping segment (15) is produceable as a one-piece injection molded part together with the housing of the card reader (1).

7. Card reader according to claim 1, characterized in that the support (11) is formed by free end (13) of a projecting part (10) extending from the back side (9) of the card reader (1) counter the direction of insertion (3), the stopping segment (15) is connected at one end with the support (11), which is disposed approximately in the center, and at the other end with side wall (16) of the card reader (1), the stopping segment (15) is a separate piece.

8. Card reader apparatus (1) into which a data storage card (2) is insertable for information exchange, the card reader apparatus comprising:

a card guide (4,5) for approximately horizontally guiding the card (2) to a data exchange position, the card guide (4,5) having an interrupted section (7) shorter than a normal card length and a support (11) disposed at an end thereof behind the interrupted section in a direction of card insertion;

a drop opening (8) disposed beneath the interrupted section (7) for enabling cards (2'), having a length shorter than a normal card length, to drop from the card reader apparatus; and a bow-shaped stopping segment (15) extending from the support (11) transversely beneath the interrupted section (7), the stopping segment being inclined upwardly toward the support (11) for guiding a front end (2a) of the card (2) on to the support (11) and into the data exchange position.

9. The card reader apparatus according to claim 8 wherein the stopping segment (15) transversely extends between a center of the card guide (4,5) to a side wall (16) of the card reader apparatus.

10. The card reader apparatus (1), according to claim 8 wherein the stopping element (15) is integrally molded in the card reader apparatus (1).

11. The card reader apparatus (1) according to claim 8 wherein the stopping element (15) is a separate piece.

12. In a card reader (1) into which a data storage card (2) is insertable for information exchange, the card reader comprising:

a card guide (4,5) for guiding the card approximately horizontal in a data exchange position, the card guide being interrupted in a section in a direction of card insertion, the interrupted section having a length shorter than a normal card length and the card guide having a support (11) disposed at an end thereof behind the interrupted section in the direction of card insertion; and a drop opening (8) disposed beneath the interrupted section (7) for enabling cards (2'), having a length shorter than the normal card length to be dropped from the card reader;

a bow-shaped stopping segment (15) extending from the support (11) to beneath the interrupted section (7), the stopping section being inclined upwards to the support (11) for guiding a front end (2a) of the card (2) onto the support (11) and into a data exchange position, the stopping segment extending from the support (11) in a center of the card guide (4,5) transversally toward a side wall.

* * * * *